2,734,017

PROCESS FOR THE PRODUCTION OF HYDROLYZED CHORIONIC GONADOTROPHIN

Albert Wettstein, Basel, and Fritz Benz, Binningen, Switzerland, assignors to Ciba Pharmaceutical Products, Inc., Summit, N. J.

No Drawing. Application July 23, 1951,
Serial No. 242,980

Claims priority, application Switzerland July 27, 1950

3 Claims. (Cl. 167—74.5)

This invention provides a process for the production of the biologically active fission products of low molecular weight of the gonadotropic hormone of the urine of pregnancy (chorionic gonadotrophin).

The gonadotropic hormone of the urine of pregnancy is a valuable medicament for a very wide variety of ovarian disturbances and also in disturbances of the functioning of male germinal glands. Chorionic gonadotrophin is formed in the chorion cells of the placenta and during the first two months of pregnancy is excreted in large quantities in the urine. In toxicoses of early and late pregnancy and also in certain other pathological conditions, such for example, as cystic moles and epithelioma of the chorion an especially high hormone titre occurs in the urine.

Chorionic gonadotrophin is a glycoprotein of high molecular weight which cannot be dialysed through semipermeable membranes, its molecular weight according to Lundgren, Gurin, Bachmann and Wilson (Journal of Biological Chemistry, vol. 142, page 367 [1942]) amounts to 100,000. In solution it is highly sensitive to raised temperature. Hydrolyzing agents such as acids and bases, but especially certain ferments such as trypsin, chymotrypsin, ptyalin and papain, rapidly destroy the biological action of the hormone, whereas pepsin has no effect or acts only slowly (Bomskov: Methodik der Hormonforschung, vol. II, page 821). Partial hydrolysis of the gonadotropic hormone of the urine of pregnancy and the isolation of active fission products of low molecular weight from the hydrolysates has not hitherto been accomplished. According to present information concerning the extraordinary sensitivity of the hormone with respect to hydrolyzing agents further experiments in this direction would appear to be unpromising.

This invention is based on the unexpected observation that active fission products of low molecular weight of chorionic gonadotrophin can be obtained by treating the hormone with a hydrolyzing agent and simultaneously dialyzing the reaction solution.

For the hydrolytic splitting any desired materials containing the gonadotropic hormone of the urine of pregnancy may be used. Advantageously, however, pure and very unitary materials are used. The hydrolytic splitting is carried out more especially with proteolytic ferments such as pepsin or trypsin. The dialysis is advantageously carried out in such manner that the external liquid has approximately the same composition as the internal liquid. Thus, for example, when chorionic gonadotrophin is to be split with a ferment such as pepsin in acid solution, the dialysis is carried out against a solution having a similar concentration of acid. As semi-permeable membranes separating the two solutions there are advantageously used those which are permeable only to peptides of low molecular weight. The form and size of the semi-permeable membrane is so chosen that a very thorough dialysis and rapid removal from the reaction medium of the active fission products of chorionic-gonadotrophin are ensured. Advantageously the external liquid is continuously renewed. An especially advantageous method is to use as the hydrolysis vessel a long narrow tube of semi-permeable material. The external liquid is caused to flow over the tube, which may be in motion, in the form of a thin flowing layer, for example, in a suitable tube. The active fission products may be recovered from the dialysate by the usual methods. Advantageously the solution is lyophilised, that is to say it is frozen and the solvent is evaporated in vacuo.

A solution of the crude material to be hydrolytically split, and also including the hydrolyzing agent, is contained in the long, narrow, thin-walled dialysing tube made of "cellophane" which is then sealed. Alternatively the tube may be of other suitable semi-permeable material, such as suitably prepared animal or vegetable materials, such as other cellulose derivatives, e. g. collodion, or parchment or suitable plastic material. The tube may also be made of solid porous material such as diaphragms of clay or sintered glass coated with a semi-permeable material, such as collodion.

The following examples illustrate the invention:

Example 1

0.1 gram of a highly purified preparation of the gonadotropic hormone of the urine of pregnancy, which has been thoroughly dialysed with respect to distilled water until the conductivity of the external liquid has become constant, is dissolved in 10 cc. of a solution of 5 mgms. of a highly active pepsin in a 0.1–N solution of acetic acid. The solution is charged into a thin walled dialysing tube, of which the surface is very large in relation to its internal capacity. The dialysing tube is then arranged within a vertical glass tube of somewhat greater length, and of which the internal diameter is only a little larger than the thickness of the filled dialysing tube. The glass tube is placed in a water bath heated at 30° C. in such manner that the regulating cock at the lower end of the tube is outside the bath. The upper end of the dialysing tube is connected to a rotatable vertical axis. As soon as the charged dialysing tube has been placed in the glass tube the remaining space within the glass tube is filled with 0.1–N solution of acetic acid, and the dialysing pipe is set in rotation. In order to maintain throughout the concentration gradient of the active fission products of low molecular weight dialysing from the interior of the dialysing tube to the exterior as high as possible and to remove the dialysed hydrolysis products as rapidly as possible from the elevated bath temperature the external liquid is continuously renewed, by supplying fresh liquid preheated to 30° C. through the upper opening of the glass tube at the same rate as the external liquid flows out through the regulating cock at the lower end of the tube. Thus, for example, every 15 minutes 50 cc. of the external liquid flows through the latter. The above described method of carrying out the dialysis enables high concentrations of dialysable active fission products of low molecular weight to be obtained in a relatively very small space and an economical recovery of these products is accomplished. The isolation of the fission products from the discharged external liquid is carried out, for example, by lyophilizing, that is to say by freezing the solution and evaporating it to dryness in a high vacuum, whereby the non-volatile fission products remain behind in the form of solid pulverulent masses. The colourless dry residues of the fission products dialysed during the first hour of the hydrolysis exhibit a high gonadotropic activity in young rats in tests on the weight of the uterus.

Example 2

The hydrolysis is carried out with the same gonadotropic preparation and under the same conditions as those used in Example 1 except that instead of pepsin, 5 mgms.

of a crystalline trypsin preparation is used and, instead of acetic acid, a solution containing in 1 liter of water 0.2 cc. of a concentrated solution of ammonia and having a pH value of 8.0. The isolation and biological examination of the collected dialysates shows that the main quantity of active fission products of low molecular weight is present in the first fraction, while the subsequent fractions contain a considerably smaller quantity.

What we claim is:

1. A process for the production of biologically active hydrolyzed products of comparatively low molecular weight from the chorionic gonadotropin hormone, comprising the steps of subjecting a liquid containing said hormone to the action of a proteolytic enzyme in a hydrolyzing zone circumscribed by an external liquid, with interposition between said zone and said external liquid of a dialytic membrane, whereby the liquid in said hydrolyzing zone constitutes the internal liquid, and simultaneously dialyzing the hydrolyzed products from said internal liquid through said dialytic membrane into the external liquid, and then isolating the obtained hydrolyzed products from the dialysate.

2. A process according to claim 1, wherein the hydrolyzed products are isolated from the dialysate by lyophilization.

3. A process according to claim 1, wherein the dialytic membrane is a cellophane membrane.

References Cited in the file of this patent

UNITED STATES PATENTS 2,196,295    Eberlein _____ Apr. 9, 1940

OTHER REFERENCES

Bradbury et al.: Proc. Soc. Exptl. Biol., June 1949, vol. 71, pgs. 228 to 232.

Elden: Article in J. Biol. Chem., February 1933, pgs. 1–9.

Fevold et al.: Article in Endocrinology, June 1940, pgs. 999–1004.

McShan et al.: Article in J. Biol. Chem., November 1943.